(12) United States Patent
Zhang et al.

(10) Patent No.: US 11,949,797 B2
(45) Date of Patent: Apr. 2, 2024

(54) NEURAL NETWORK MODEL UPDATE METHOD AND DEVICE, AND COMPUTER STORAGE MEDIUM

(71) Applicant: Jinan University, Guangzhou (CN)

(72) Inventors: Jilian Zhang, Guangzhou (CN); Kailun Yan, Guangzhou (CN); Yongdong Wu, Guangzhou (CN); Jian Weng, Guangzhou (CN)

(73) Assignee: Jinan University, Guangzhou (CN)

( * ) Notice: Subject to any disclaimer, the term of this patent is extended or adjusted under 35 U.S.C. 154(b) by 289 days.

(21) Appl. No.: 17/447,612

(22) Filed: Sep. 14, 2021

(65) Prior Publication Data

US 2022/0209963 A1 Jun. 30, 2022

(30) Foreign Application Priority Data

Dec. 24, 2020 (CN) .......................... 202011557239.0

(51) Int. Cl.
*H04L 9/32* (2006.01)
*G06F 18/214* (2023.01)
*G06N 3/04* (2023.01)

(52) U.S. Cl.
CPC ........ *H04L 9/3255* (2013.01); *G06F 18/2148* (2023.01); *G06N 3/04* (2013.01); *H04L 9/3239* (2013.01); *H04L 9/3265* (2013.01)

(58) Field of Classification Search
None
See application file for complete search history.

(56) References Cited

U.S. PATENT DOCUMENTS

2017/0344829 A1* 11/2017 Lan ...................... G06V 40/103
2018/0005445 A1* 1/2018 McCulloch .......... G02B 27/017
(Continued)

FOREIGN PATENT DOCUMENTS

CN 108234127 A 6/2018
CN 109376534 A 2/2019
(Continued)

OTHER PUBLICATIONS

Androulaki et al., Evaluating User Privacy in Bitcoin, Financial Cryptography and Data Security, vol. 7859, dated Apr. 2013.
(Continued)

*Primary Examiner* — William J. Goodchild
(74) *Attorney, Agent, or Firm* — Westbridge IP LLC

(57) ABSTRACT

Disclosed are a neural network model update method and device, and a computer storage medium. The method includes: randomly generating a preset number of sub-neural network models as nodes in a blockchain; using a ring signature to share a local data set in the blockchain, and uniformly dividing a data set in the blockchain to generate a training set and a test set; training each node through the training set to generate a trained model, packaging the trained model as a model transaction and sharing the model transaction in the blockchain; using the test set selected by voting to test the model transaction and generating a test result; when the test result is greater than a benchmark evaluation, taking the sub-neural network model corresponding to the test result as a valid vote; and voting a previous block corresponding to the valid vote, selecting a consistent block, and updating all nodes.

8 Claims, 11 Drawing Sheets

(56) References Cited

U.S. PATENT DOCUMENTS

2018/0157938 A1* 6/2018 Wang .................. G06N 3/045
2019/0051291 A1* 2/2019 Yoo .................. G10L 15/063

FOREIGN PATENT DOCUMENTS

| CN | 109543075 A | 3/2019 |
| CN | 110598802 A | 12/2019 |
| CN | 110784507 A | 2/2020 |
| CN | 110879827 A | 3/2020 |

OTHER PUBLICATIONS

Bonawitz et al., Towards Federated Learinging at Scale: System Design, Proceeding of the 2nd SysML Conference, Palo Alto, CA, USA, dated Mar. 22, 2019.

Cohen, Incentives Build Robustness in BitTorrent, P2PEcon' 03: The First Workshop on Economics of Peer-to-Peer Systems, dated May 22, 2003.

Conti et al., A Survey on Security and Privacy Issues of Bitcoin, IEEE Communications Surveys and Tutorials, vol. 20, No. 4, dated Dec. 25, 2017.

Han et al., Learning both Weights and Connections for Efficient Neural Networks, NIPS 15: Proceedings of the 28th International Conference on Neural Information Processing Systems, dated Oct. 30, 2015.

Kiayias et al., Ouroboros: A Provably Secure Proof-of-Stake Blockchain Protocol, CRYPTO 2017, Part 1, LNCS 10401, pp. 357-388, dated 2017.

Lecun et al., Gradient-Based Learning Applied to Document Recognition, Proc. of the IEEE, pp. 1-46, dated Nov. 1998.

Yuan et al., Blockchain Consensus Algorithms: The State of the Art and Future Trends, Acta Automatica Sinica, vol. 44, No. 11, pp. 2011-2022, dated Nov. 2018.

Zheng et al., An Overview of Blockchain Technology: Architecture, Consensus, and Future Trends, 2017 IEEE 6th International Congress on Big Data, pp. 557-564, dated Jun. 2017.

Grant Notification issued in counterpart Chinese Patent Application No. 202011557239.0, dated Dec. 13, 2023.

Second Office Action issued in counterpart Chinese Patent Application No. 202011557239.0, dated Oct. 28, 2023.

* cited by examiner

NEURAL NETWORK MODEL UPDATE METHOD AND DEVICE, AND COMPUTER STORAGE MEDIUM

CROSS-REFERENCE TO RELATED APPLICATIONS

This application claims priority to Chinese Patent Application No. 202011557239.0, filed on Dec. 24, 2020, the entire disclosure of which is incorporated herein by reference.

TECHNICAL FIELD

The present disclosure relates to the field of blockchain and machine learning, in particular to a neural network model update method and device, and a computer storage medium.

BACKGROUND

Due to rapid development and excellent performance, neural network has been applied in many fields. For example, machine learning begins to be applied to online-shopping software and search software to improve user experience. The data used by software companies to train machine learning models generally comes from user-collected or public data sets. Collecting user data has the risk of user privacy leakage, and the data time series attributes are generally not considered in the training process, and the trained model cannot adapt to dynamic changes of users. Meanwhile, the update of the machine learning model is completely dependent on the software company, and there are cases where the user groups using the software have changed, but the models in the software have not been updated in time.

Besides, the neural network has a certain degree of redundancy, and a much smaller sub-network can be found to replace the current model to obtain the same model expression ability. There are many methods for randomly dividing the neural network model. For example, the skeleton network is selected as the basis of training through model compression and deletion, and each node selects some other neural nodes for exploratory training.

As a distributed trusted database, the blockchain has the characteristics of decentralization, which solves the consensus problem among multiple parties. The consensus mechanism is the core of the blockchain. Common consensus mechanisms include PoW, PoS, DPoS, and PBFT. The PoW adopted by Bitcoin is the most widely recognized consensus mechanism. Bitcoin's proof of work mechanism is essentially that nodes obtain the right to book by calculating a specific hash value as proof of work, so that the entire network can reach an agreement. In order to ensure the security of the blockchain, a large amount of computing power is used to calculate meaningless hash values.

SUMMARY

In view of this, a neural network model update method and device, and a computer storage medium are provided to solve the problem that the neural network model in the related art cannot adapt to user dynamic changes and data changes.

The embodiments of the present disclosure provide a neural network model update method, and the method includes:

randomly generating a preset number of sub-neural network models as nodes in a blockchain based on a skeleton neural network;

using a ring signature to share a local data set in the blockchain, and uniformly dividing a data set in the blockchain to generate a training set and a test set;

training each node separately through the training set to generate a trained model, packaging the trained model as a model transaction and sharing the model transaction in the blockchain;

using the test set selected by voting to test the model transaction and generating a test result;

when the test result is greater than a benchmark evaluation, taking the sub-neural network model corresponding to the test result as a valid vote; and voting a previous block corresponding to the valid vote, selecting a consistent block, and updating all nodes.

In an embodiment, the operation of using a ring signature to share a local data set in the blockchain, and uniformly dividing the data set in the blockchain to generate a training set and a test set includes:

using the ring signature to package the local data set into a data transaction and sharing the data transaction anonymously in the blockchain, wherein the data transaction includes a transaction hash value, a data hash value, a timestamp, the ring signature, and a public key set; and using a hash value of a new block in Bitcoin as a random seed for dividing a data set to uniformly divide the data set to generate the training set and the test set.

In an embodiment, a process of obtaining the test set selected by voting includes:

voting on the training set for training the model transaction, and obtaining the data set corresponding to the training set with most votes; and obtaining the test set according to the data set; wherein the data set includes one test set and one training set.

In an embodiment, the benchmark evaluation includes:

using the test set selected by the voting to test a model of the previous block to obtain the benchmark evaluation.

In an embodiment, the model transaction includes at least following parts:

a transaction basic part including a transaction hash value, a timestamp, a signature and a public key;

a model and proof of work part including a model hash value, a model evaluation and a Merkel root of a model training set; and a voting part including a hash value of the previous block and a Merkel root of the data set.

In an embodiment, a block includes a hash value of the block, a hash value of the previous block, a hash value of a model of the block, a timestamp, and a Merkel root of a voting result.

In an embodiment, a construction process of the Merkel root of the voting result includes:

using the hash value of the previous block as a leaf node of the Merkel tree of the voting result in turn according to a descending order of the hash value of the previous block corresponding to the valid vote, and calculating a hash value of the leaf node;

performing a hash calculation on hash values of leaf nodes in pairs to generate a first sub-hash value; and performing a hash calculation on first sub-hash values in pairs to generate the Merkel root of the voting result, wherein the leaf node of the Merkel tree of the voting result includes a Merkel root of the valid vote.

In an embodiment, a construction process of the Merkel root of the valid vote includes:

using a hash value of the valid vote as a leaf node of the Merkel tree of the valid vote in turn according to a descending order of the test result of the valid vote, and calculating hash values of leaf nodes in pairs to generate a second sub-hash value; and performing a hash calculation on second sub-hash values in pairs to generate the Merkel root of the valid vote.

In order to achieve the above objective, the present disclosure further provides a computer readable storage medium, a neural network model update program is stored in the computer readable storage medium, and the neural network model update program, when executed by a processor, implements operations of the neural network model update method as described above.

In order to achieve the above objective, the present disclosure further provides a neural network model update device, including: a memory, a processor, and a neural network model update program stored in the memory and executable on the processor, the neural network model update program, when executed by the processor, implements operations of the neural network model update method as described above.

One or more technical solutions provided in the embodiments of the present disclosure have at least the following technical effects or advantages. A preset number of sub-neural network models are randomly generated as nodes in a blockchain based on a skeleton neural network. In this operation, random exploration is carried out according to the skeleton neural network, and multiple sub-neural networks are generated as nodes in the blockchain, which lays the foundation for subsequent data and model sharing. A ring signature is used to share a local data set in the blockchain, and a data set in the blockchain is uniformly divided to generate a training set and a test set. This operation guarantees the security of the local data set and the privacy of the node. Each node is trained separately through the training set to generate a trained model, the trained model is packaged as a model transaction and the model transaction is shared in the blockchain. The model transaction in this operation ensures that the model data cannot be tampered with. The test set selected by is used to test the model transaction and a test result is generated. This operation is a necessary condition for subsequent model evaluation. When the test result is greater than a benchmark evaluation, the sub-neural network model corresponding to the test result is used as a valid vote, a previous block corresponding to the valid vote is voted, a consistent block is selected, and all nodes are updated. In this operation, the proof of work mechanism in the blockchain is used to vote, the valid votes is a node with proof of work, the consistent block is selected and all nodes are updated. The present disclosure solves the problem that the neural network model in the related art cannot adapt to the dynamic changes of the user, and realizes that the model update does not depend on the third party.

DETAILED DESCRIPTION OF THE EMBODIMENTS

It should be understood that the specific embodiments described here are only used to explain the present disclosure, but not intended to limit the present disclosure.

The main solution of the embodiments of the present disclosure is: randomly generating a preset number of sub-neural network models as nodes in a blockchain based on a skeleton neural network; using a ring signature to share a local data set in the blockchain, and uniformly dividing a data set in the blockchain to generate a training set and a test set; training each node separately through the training set to generate a trained model, packaging the trained model as a model transaction and sharing the model transaction in the blockchain; using the test set selected by voting to test the model transaction and generating a test result; when the test result is greater than a benchmark evaluation, using the sub-neural network model corresponding to the test result as a valid vote; and voting a previous block corresponding to the valid vote, selecting a consistent block, and updating all nodes. The present disclosure solves the problem that the neural network model cannot adapt to the dynamic changes of the user, and realizes that the model update does not depend on the third party.

In order to better understand the above technical solutions, the above technical solutions will be described in detail below in conjunction with the accompanying drawings of the specification and specific embodiments.

Figure 1:
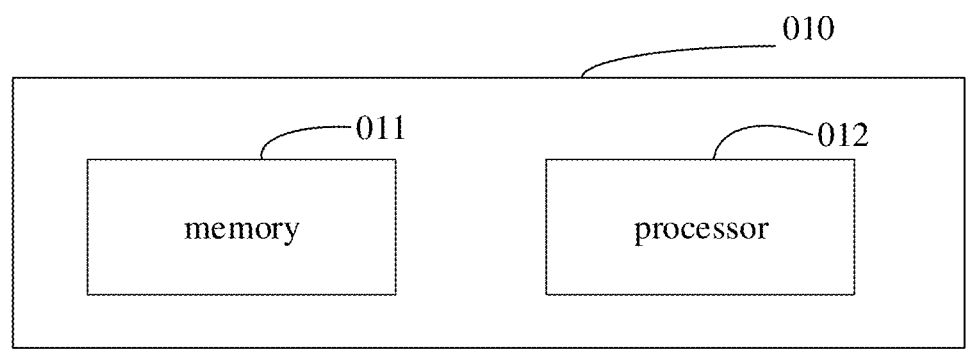
FIG. 1 is a schematic diagram of a hardware architecture of a neural network model update method according to an embodiment of the present disclosure.

The present disclosure relates to a neural network model update device 010, including at least one processor 012 and a memory 011 as shown in FIG. 1.

The processor 012 may be an integrated circuit chip with signal processing capabilities. During the implementation process, each operation of the above method can be completed by an integrated logic circuit of hardware in the processor 012 or instructions in the form of software. The aforementioned processor 012 may be a general-purpose processor, a digital signal processor (DSP), an application specific integrated circuit (ASIC), a field programmable gate array (FPGA) or other programmable logic device, discrete gate or transistor logic device, discrete hardware component. The methods, operations, and logical block diagrams disclosed in the embodiments of the present disclosure can be implemented or executed. The general-purpose processor may be a microprocessor or the processor may also be any conventional processor or the like. The software module can be located in a mature storage medium in the field, such as a random access memory, a flash memory, a read-only memory, a programmable read-only memory, or an electrically erasable programmable memory, a register. The storage medium is located in the memory 011, and the processor 012 reads the information in the memory 011, and completes the operations of the foregoing method in combination with its hardware.

It can be understood that the memory 011 in the embodiment of the present disclosure may be a volatile memory or a non-volatile memory, or may include both volatile and non-volatile memory. The non-volatile memory may be read only memory (ROM), programmable read only memory (PROM), erasable programmable read only memory (EPROM), electrically erasable programmable read only memory (EEPROM), or flash memory. Volatile memory may be random access memory (RAM), which is used as an external cache. By way of exemplary but not restrictive illustration, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM) and direct rambus random access memory (DRRAM). The memory 011 of the system and method described in the embodiment of the present disclosure is intended to include, but is not limited to, these and any other suitable types of memory.

Figure 2:
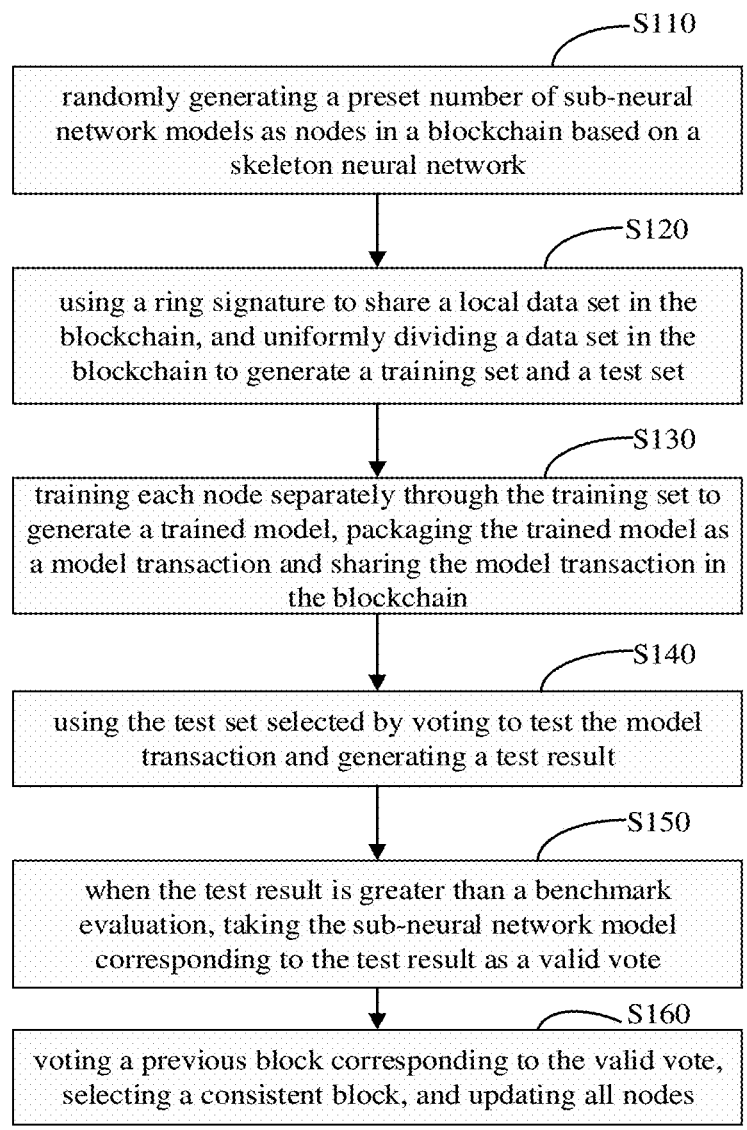
FIG. 2 is a schematic flowchart of the neural network model update method according to a first embodiment of the present disclosure.

Referring to FIG. 2, FIG. 2 is a neural network model update method according to a first embodiment of the present disclosure, and the method includes:

Operation S110, randomly generating a preset number of sub-neural network models as nodes in a blockchain based on a skeleton neural network.

Figure 3:
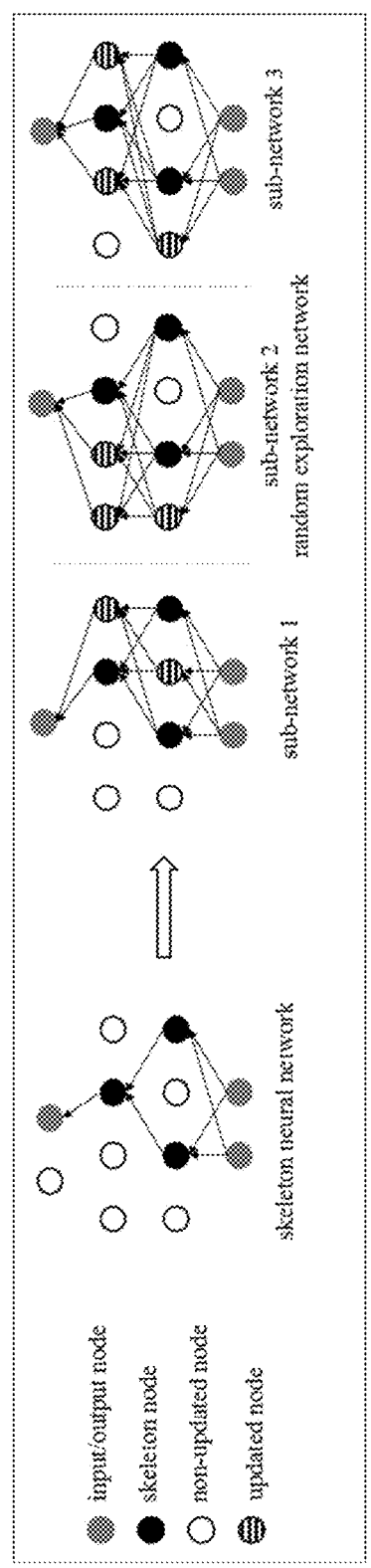
FIG. 3 is a schematic diagram of random division of neural network.

As shown in FIG. 3, the skeleton neural network includes an input/output node, a skeleton node, a non-update node and an update node.

In this embodiment, the sub-networks are randomly generated based on the skeleton neural network. As shown in FIG. 3, the sub-network 1 includes two input nodes, three skeleton nodes, two update nodes, three non-update nodes, and one output node. The sub-network 2 includes two input nodes, three skeleton nodes, three update nodes, two non-update nodes, and one output node. The sub-network 3 includes two input nodes, three skeleton nodes, three update nodes, two non-update nodes and one output node. The nodes composed of sub-network 2 and sub-network 3 are the same, but the positions of each node based on the skeleton neural network are not the same. Therefore, the nodes of the randomly generated sub-network and the positions of the nodes are not limited, and can be composed of any nodes and any positions of the nodes in the skeletal neural network.

The preset number is not limited here, which is dynamically adjusted according to the corresponding business needs.

Operation S120, using a ring signature to share a local data set in the blockchain, and uniformly dividing the data set in the blockchain to generate a training set and a test set.

The ring signature is a digital signature scheme, originally proposed by Rivest et al. The ring signature is a simplified group signature. In the ring signature, there are only ring members without managers, and no cooperation between ring members is required. The ring signature is a signature scheme that can realize the unconditional anonymity of the signer. It is a special group signature. There is no trusted center and no group establishment process. For the verifier, the signer is completely correct and anonymous. The ring signature has correctness, unconditional anonymity and unforgeability.

Unified division can be that the local data set division criteria of all nodes must be consistent.

The division of all data must be consistent at all nodes. In other words, if data at one node is divided into the test set, then all nodes will be divided into the test set.

If the division is inconsistent, some nodes may use test data as training data.

Uniform division rules ensure the effectiveness of training data.

A local data set is a data set collected locally by a node, and the local data set can change during the training process.

The data set in the blockchain may be a sum of local data sets shared by all nodes using ring signatures, or a combination of local data sets shared by nodes using ring signatures, which is not limited here.

Operation S130, training each node separately through the training set to generate a trained model, packaging the trained model as a model transaction and sharing the model transaction in the blockchain.

The decentralized nature of the blockchain is used, the model transaction is shared to the blockchain to ensure that the model transaction cannot be tampered with, thereby ensuring the correctness of the trained model in the current block.

Operation S140, using the test set selected by voting to test the model transaction and generating a test result.

The test set selected by voting is used to test the trained model of each node and the test result is generated. The test result can be measured by correctness, accuracy, and F1 value, or other measurement standards, which is not limited here.

Operation S150, when the test result is greater than a benchmark evaluation, using the sub-neural network model corresponding to the test result as a valid vote.

When the accuracy of the test result or the F1 value is higher, the corresponding sub-network model has a higher computing power.

If the sub-neural network model is used as the valid vote, it means that the node is a node with proof of work.

Proof of work (POW) is an economic countermeasure against service and resource abuse, or denial of service attacks. Generally, users are required to perform some time-consuming and appropriate complex calculations, and the answers can be quickly checked by the service party, using the time, equipment, and energy consumed as guarantee costs to ensure that the service and the resource are used by real needs. In short, a certificate confirms that you have done a certain amount of work. The entire process of monitoring work is usually extremely inefficient, and it is a very efficient way to verify the completion of the corresponding workload by certifying the results of the work.

The consensus mechanism can also be PoS, DPoS, PBFT, etc., which are not limited here.

The essence of Bitcoin's proof-of-work mechanism is that nodes obtain the right to book by calculating a specific hash value as proof of work, so that the entire network can reach an agreement, thereby ensuring the security of the blockchain.

Operation S160, voting a previous block corresponding to the valid vote, selecting a consistent block, and updating all nodes.

Only nodes with proof of work can have voting rights. In the chain, a single node single vote system is used to vote on blocks, and the block with the most votes is regarded as a consistent new block. The node packs the new block into the model chain by itself, so that a single node cannot do evil or be lazy.

The consistent block contains the optimal model hash value, which can be used as a basis for updating all nodes.

In the above embodiment, the beneficial effects are the following. A preset number of sub-neural network models are randomly generated as nodes in a blockchain based on a skeleton neural network. In this operation, random exploration is carried out according to the skeleton neural network, and multiple sub-neural networks are generated as nodes in the blockchain, which lays the foundation for subsequent data and model sharing. A ring signature is used to share a local data set in the blockchain, and a data set in the blockchain is uniformly divided to generate a training set and a test set. This operation guarantees the security of the local data set and the privacy of the node. Each node is trained separately through the training set to generate a trained model, the trained model is packaged as a model transaction and the model transaction is shared in the blockchain. The model transaction in this operation ensures that the model data cannot be tampered with. The test set selected by is used to test the model transaction and a test result is generated. This operation is a necessary condition for subsequent model evaluation. When the test result is greater than a benchmark evaluation, the sub-neural network model corresponding to the test result is used as a valid vote, a previous block corresponding to the valid vote is voted, a consistent block is selected, and all nodes are updated. In this operation, the proof of work mechanism in the blockchain is used to vote, the valid votes is a node with proof of work, the consistent block is selected and all nodes are updated. The present disclosure solves the problem that the neural network model in the related art cannot adapt to the dynamic changes of the user, and realizes that the model update does not depend on the third party.

Figure 4:
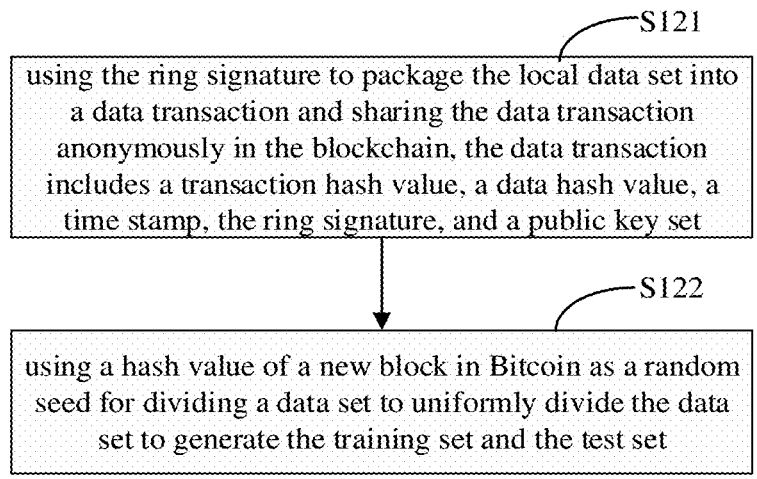
FIG. 4 is a schematic flowchart of operation S120 of the neural network model update method according to the first embodiment of the present disclosure.

As shown in FIG. 4, FIG. 4 shows specific implementation operations of operation S120 of the neural network model update method according to a first embodiment of the present disclosure. The operation of using a ring signature to share a local data set in the blockchain, and uniformly dividing the data set in the blockchain to generate a training set and a test set includes:

Operation S121, using the ring signature to package the local data set into a data transaction and sharing the data transaction anonymously in the blockchain, wherein the data transaction includes a transaction hash value, a data hash value, a timestamp, the ring signature, and a public key set.

The data transaction may be a way of sharing data, in this embodiment, sharing data-related information in the blockchain.

Figure 5:
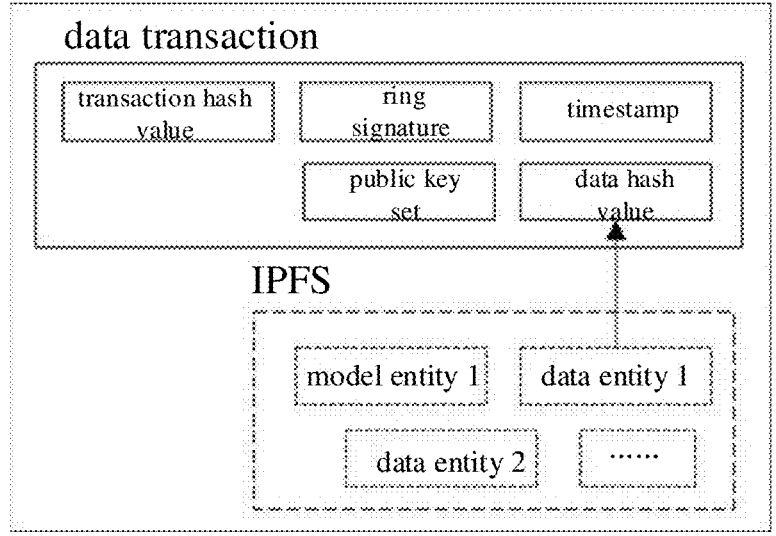
FIG. 5 is a schematic diagram of a data transaction.

FIG. 5 shows a schematic diagram of a data transaction.

Operation S122, using a hash value of a new block in Bitcoin as a random seed for dividing a data set to uniformly divide the data set to generate the training set and the test set.

The generation of new blocks in the Bitcoin network is monitored. Once a new block is received, the hash value of the new block is used as a random seed for dividing the data set.

Generally speaking, Bitcoin generates a new block about every 10 minutes, but the exact generation time is unknown and it is a probabilistic event.

The local data set of all nodes in the blockchain has newly added data, or the part of the local data set has been deleted, then the block chain will reuse the unified random seed to divide the current changed local data set to generate the training set and the test set in the new block.

In the above embodiment, the beneficial effects are: the node uses the ring signature to share the local data set in the blockchain, and uniformly divides the data set in the blockchain to generate a training set and a test set, and data transactions are shared in the blockchain to ensure the correctness and safety of data transactions.

Figure 6:
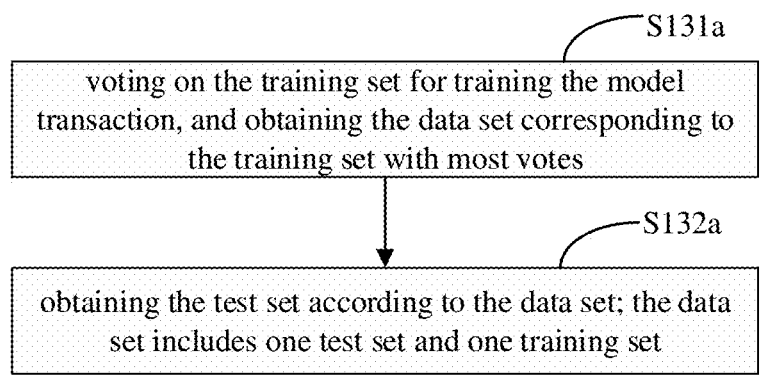
FIG. 6 is a schematic diagram of an acquisition process of a test set selected by voting.

As shown in FIG. 6, FIG. 6 is a process of obtaining the test set selected by voting in the neural network model update method of the present disclosure, including:

Operation S131a, voting on the training set for training the model transaction, and obtaining the data set corresponding to the training set with most votes.

During the process of sharing data transaction, the following situations may exist, resulting in different training sets of model transactions:

1. The node may not receive part of the data due to failure.
2. The data set shared by the nodes did not spread to most of the nodes, and new blocks were generated.

Therefore, it is necessary to vote on the training set to select the most used training set.

Operation S132a, obtaining the test set according to the data set; the data set includes one test set and one training set.

According to the selected training set that is most used, the corresponding data set is obtained, thereby obtaining the test set.

In this embodiment, the model transaction is tested according to the test set selected by the voting, and the test result is obtained to measure whether the model transaction is the valid vote. In this operation, the voting of the test set is correct to ensure the correctness of whether the model transaction is the valid vote.

In an embodiment, the benchmark evaluation includes:
using the test set selected by the voting to test a model of the previous block to obtain the benchmark evaluation.

In this embodiment, the correctness of the benchmark evaluation ensures the correctness of the valid vote, thereby ensuring the correctness of the voting results of the block.

In an embodiment, the model transaction includes at least following parts:

a transaction basic part including a transaction hash value, a timestamp, a signature and a public key;

a model and proof of work part including a model hash value, a model evaluation and a Merkel root of a model training set; and a voting part including a hash value of the previous block and a Merkel root of the data set.

Figure 7:
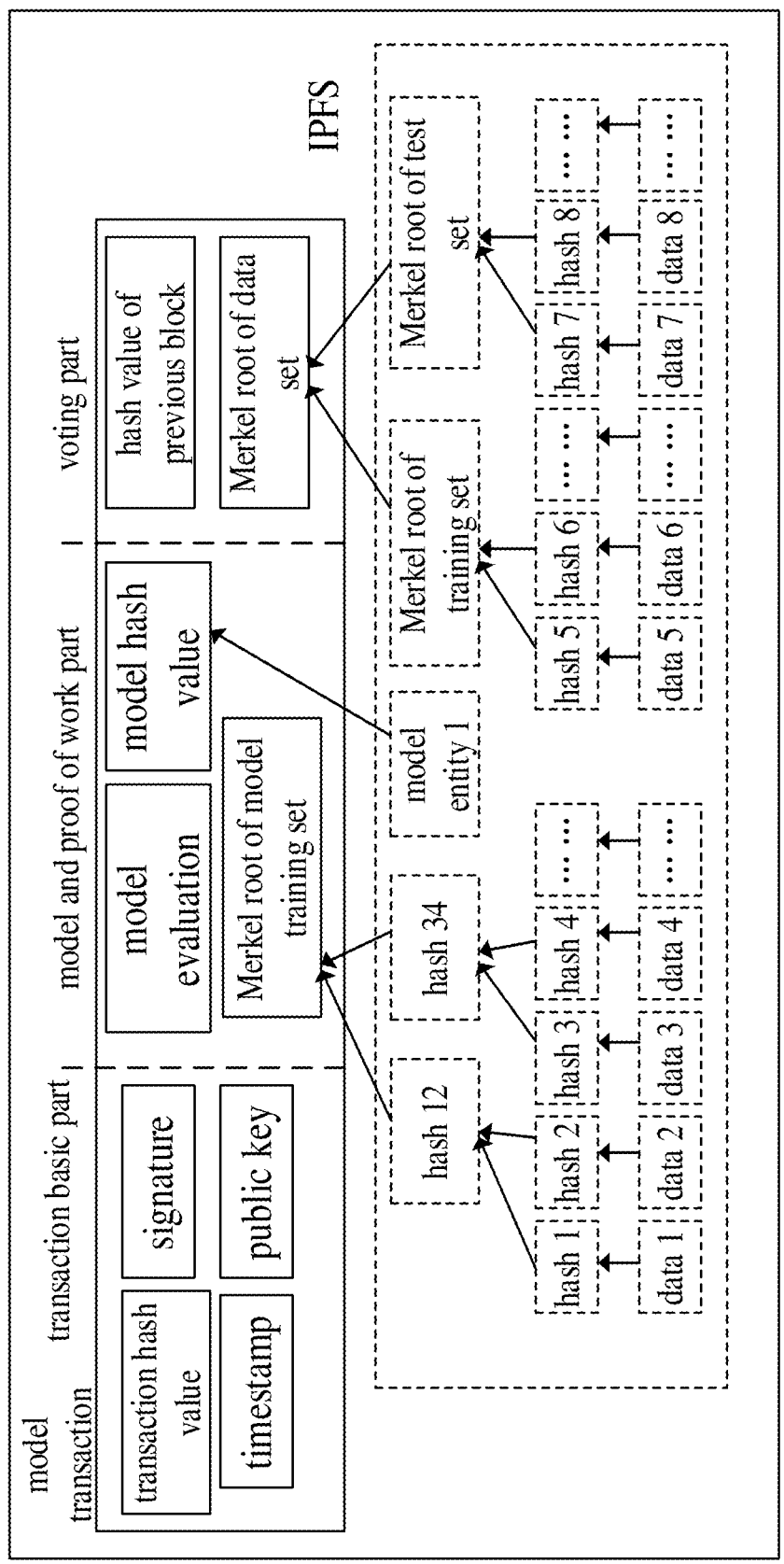
FIG. 7 is a schematic diagram of a model transaction.

FIG. 7 shows a composition of a model transaction.

The hash value can map a longer piece of data into a shorter piece of data through a certain hash algorithm (typically MD5, SHA-1, etc., which are not limited here), and this piece of small data is the hash value of the big data.

Timestamp is data generated using digital signature technology, and the object of signature includes original file information, signature parameters, signature time and other information. The timestamp system is used to generate and manage timestamps, and digitally sign signature objects to generate the timestamp to prove that the original document already exists before the signature time.

The signature can be a digital signature, which is a digital string that can only be generated by the sender of the information and cannot be forged by others. This digital string is also a valid proof of the authenticity of the message sent by the sender of the message.

There are two basic requirements for digital signatures:

1. Usability: the information encrypted by the private key can be decrypted by the public key, and the correct result can be obtained.

2. Irreversibility: even if countless ciphertexts are obtained, the content of the private key cannot be obtained, and the private key cannot be forged to encrypt other information.

The public key is the non-secret part of the key pair used with the private key algorithm. The public key is usually used to encrypt session keys, verify digital signatures, or encrypt data that can be decrypted with the corresponding private key. A public key and a private key are a key pair (that is, one public key and one private key) obtained through an algorithm. One of them is disclosed to the outside world and is called a public key; the other is kept by itself and is called a private key.

In an embodiment, a block includes a hash value of the block, a hash value of the previous block, a hash value of a model of the block, a timestamp, and a Merkel root of a voting result.

Figure 8:
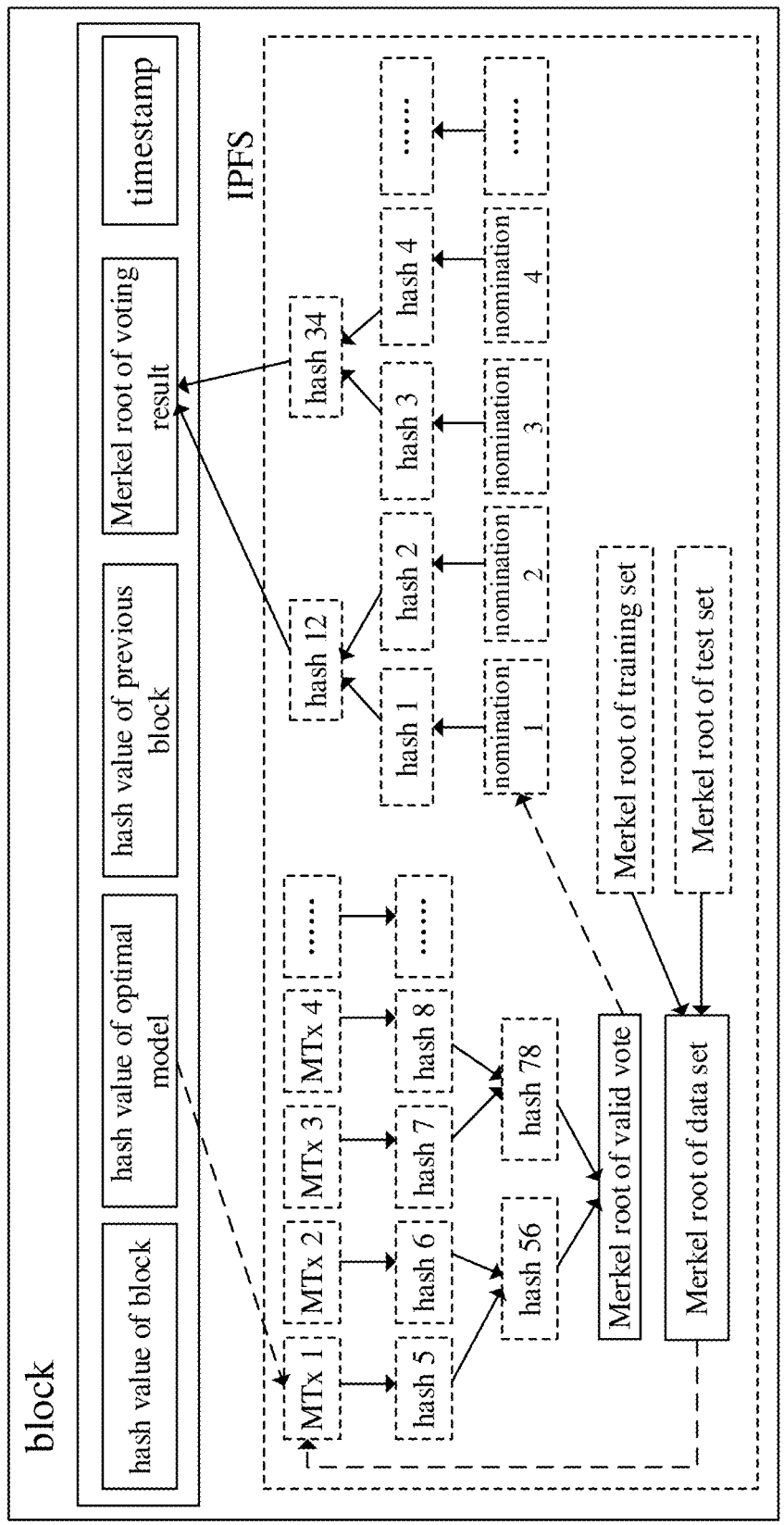
FIG. 8 is a schematic diagram of a block.

FIG. 8 shows a composition of a block and a dotted line in FIG. 8 is a contained relationship.

Votes of the same nomination form a Merkel tree, and a root of this Merkel tree represents all the votes cast for this nomination. Then, the roots of the Merkel tree are sorted in descending order according to the number of votes, and then used as leaf nodes to form a new Merkel tree, which is stored in the block as the final voting result.

Figure 9:
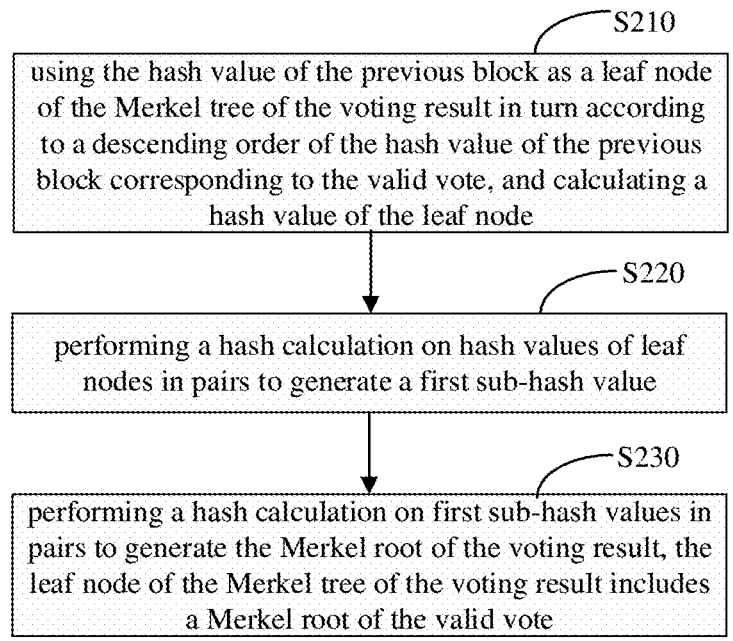
FIG. 9 is a schematic diagram of a construction process of a Merkel root of a voting result.

As shown in FIG. 9, FIG. 9 shows a construction process of a Merkel root of the voting result, including:

Operation S210, using the hash value of the previous block as a leaf node of the Merkel tree of the voting result in turn according to a descending order of the hash value of the previous block corresponding to the valid vote, and calculating a hash value of the leaf node.

Operation S220, performing a hash calculation on the hash values of the leaf nodes in pairs to generate a first sub-hash value.

Operation S230, performing a hash calculation on the first sub-hash values in pairs to generate the Merkel root of the voting result, the leaf node of the Merkel tree of the voting result includes a Merkel root of the valid vote.

The beneficial effect of the above-mentioned embodiment is: the construction process of Merkel root of the voting result is specifically given to ensure the correctness and safety of the voting result.

Figure 10:
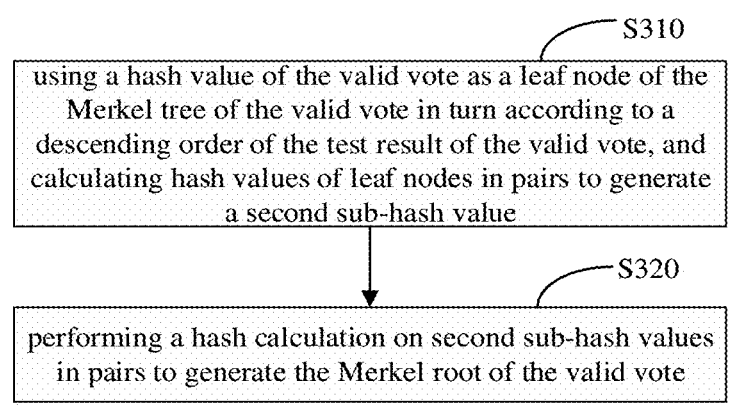
FIG. 10 is a schematic diagram of a construction process of a Merkel root of a valid vote.

As shown in FIG. 10, FIG. 10 shows a construction process of a Merkel root of the valid vote, including:

Operation S310, using a hash value of the valid vote as a leaf node of the Merkel tree of the valid vote in turn according to a descending order of the test result of the valid vote, and calculating the hash value of the leaf node in pairs to generate a second sub-hash value.

Operation S320, performing a hash calculation on the second sub-hash values in pairs to generate the Merkel root of the valid vote.

The beneficial effect of the foregoing embodiment is that the construction process of the Merkel root of the valid vote is specifically given to ensure the correctness and safety of valid votes.

Figure 11:
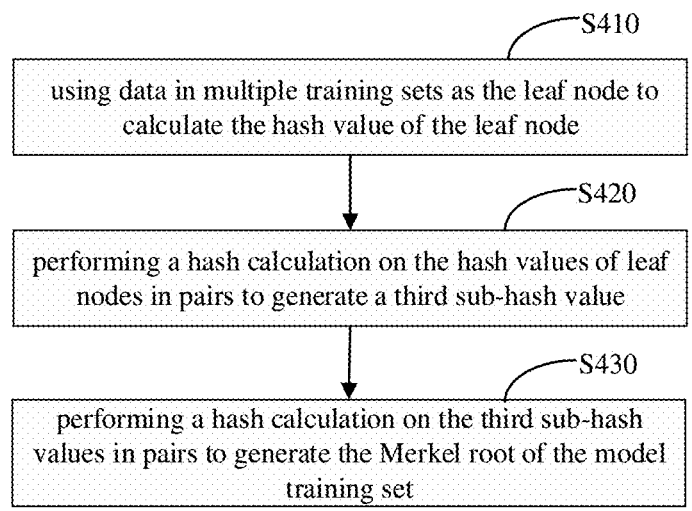
FIG. 11 is a schematic diagram of a construction process of a Merkel root of a model training set.

As shown in FIG. 11, FIG. 11 is a construction process of a Merkel root of the model training set, including:

Operation S410, using data in multiple training sets as the leaf node to calculate the hash value of the leaf node.

Operation S420, performing a hash calculation on the hash values of leaf nodes in pairs to generate a third sub-hash value.

Operation S430, performing a hash calculation on the third sub-hash values in pairs to generate the Merkel root of the model training set.

The beneficial effect of the above-mentioned embodiment is that the construction process of the Merkel root of the model training set is specifically given to ensure the correctness and safety of the model training set.

Figure 12:
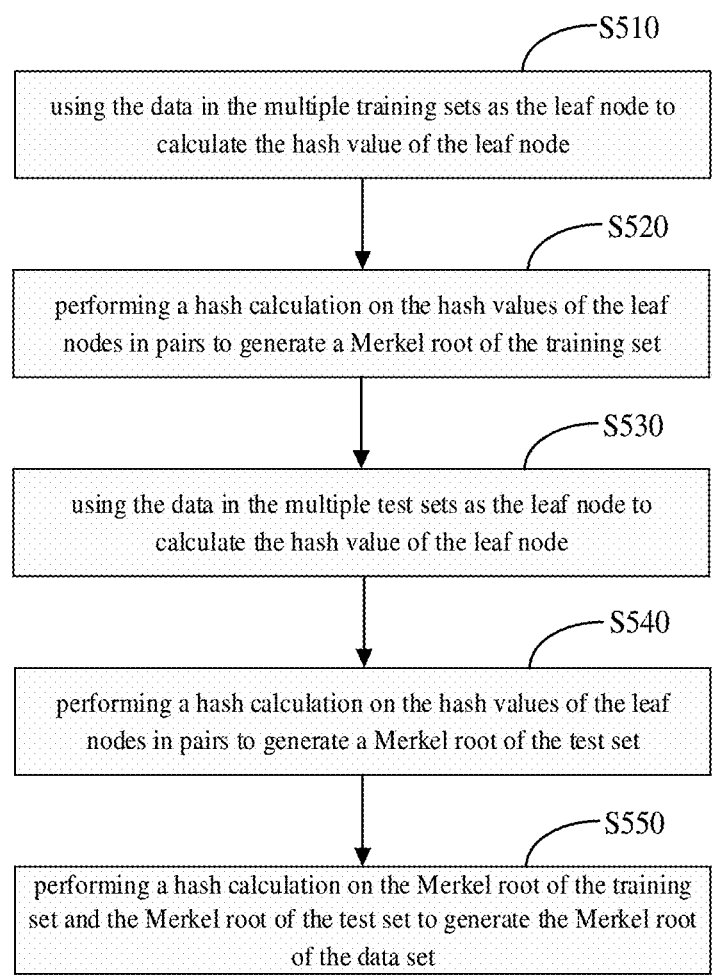
FIG. 12 is a schematic diagram of a construction process of a Merkel root of a data set.

As shown in FIG. 12, FIG. 12 is a construction process of a Merkel root of the data set, including:

Operation S510, using the data in the multiple training sets as the leaf node to calculate the hash value of the leaf node.

Operation S520, performing a hash calculation on the hash values of the leaf nodes in pairs to generate a Merkel root of the training set.

Operation S530, using the data in the multiple test sets as the leaf node to calculate the hash value of the leaf node.

Operation S540, performing a hash calculation on the hash values of the leaf nodes in pairs to generate a Merkel root of the test set.

Operation S550, performing a hash calculation on the Merkel root of the training set and the Merkel root of the test set to generate the Merkel root of the data set.

The beneficial effect of the foregoing embodiment is that the construction process of the Merkel root of the data set is specifically given to ensure the correctness and safety of the data set.

The following is an example of the present disclosure, and the scope of the present disclosure is not limited to the following embodiments.

This example uses 5500 computer digit fonts to generate a data set. Each computer font is regarded as a user font, and stretching, tilting, and scaling of the font are regarded as the noise of the user's handwriting. In each round of block generation, 2200 fonts are transformed 25 times, and 55,000 28*28 pixel single-channel images are generated for each number, of which 85% are used as training data and 15% are used as test data. After the new block is generated, half of the old fonts are replaced with new fonts, and a new round of data set is generated again to simulate the dynamic changes of users in the blockchain.

Figure 13:
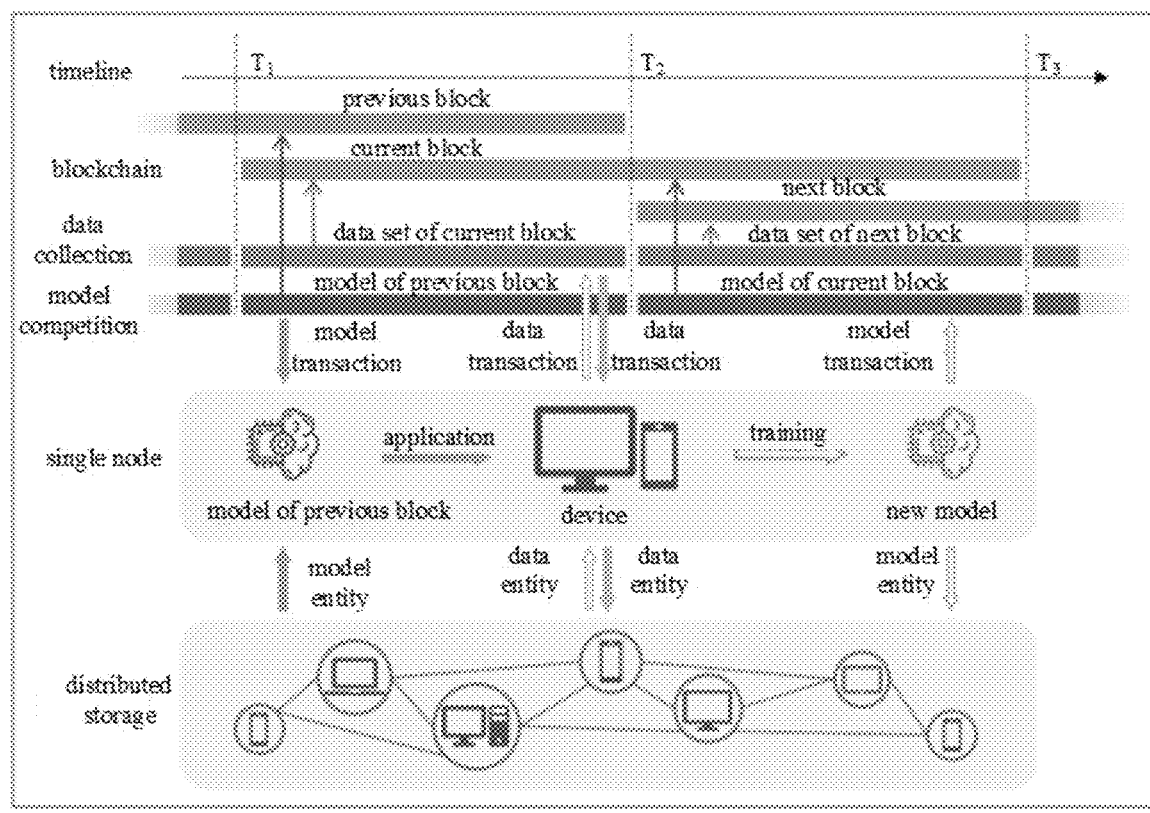
FIG. 13 is an experimental schematic diagram of the neural network model update method according to the present disclosure.

The node model training uses the deeplearning4j framework, a convolutional neural network is set up as a skeleton network, and 10 nodes are set up for exploratory training. After each round of block generation, an optimal model is selected (that is, the hash value of the model in FIG. 7). In the next round of model training, the node will refer to the training result of the previous block to adjust the model and restart training. The experiment conducted a total of 5 rounds of block generation (as shown in FIG. 13), using Accuracy, Precision, and F1 Score as evaluation indicators. The following table shows the evaluation of the optimal model in each block on the test set. As can be seen from the table, as the data set changes (that is, the dynamic changes of users in actual situations), a prediction result of the optimal model of the previous block in the new data set drops significantly. The evaluation of the optimal model is significantly improved compared to the evaluation of the optimal model of the previous block. For example, in the second block, an accuracy rate of the optimal model of the first block drops from 96.06% to 95.34%. Owing to the exploratory training based on the skeletal neural network model, the accuracy rate in this block is increased to 96.72%.

In terms of time efficiency, the training time of the optimal model for each block is 391 s, 471 s, 420 s, 515 s, and 605 s, respectively. The average time for model verification is 4.52 s, and the average round of voting for consensus takes 90.40 s in total. Since the model competition phase lasts for a long time, the node has enough time for model training and voting. At present, a single node verifies the entire test set. If multiple nodes cooperate, each node verifies a part of the test set separately, which can greatly reduce the time-consuming model verification and improve the consensus efficiency.

In practical applications, the nodes in the blockchain of the present disclosure continue to explore new model to replace the previously generated model. When the user group in the chain does not change much, the model in the chain tends to be stable. When the user group in the chain changes greatly, the accuracy of the model in the chain will first decrease (this is determined by the generalization of the optimal model), and then gradually stabilize as the number of blocks in the model chain continues to increase. In the 5 rounds of block generation process, the evaluation of the optimal model is continuously improving, which shows that the multi-node model exploration in the blockchain of the present disclosure has a good effect, not only can adapt to the dynamic change of the data set, but also improves the evaluation of the model.

| height of block | | 1 | 2 | 3 | 4 | 5 |
|---|---|---|---|---|---|---|
| optimal model | Accuracy | 0.9595 | 0.9666 | 0.9769 | 0.9803 | 0.9828 |
| | Precision | 0.9606 | 0.9672 | 0.9774 | 0.9806 | 0.9829 |
| | F1 Score | 0.9597 | 0.9667 | 0.9770 | 0.9803 | 0.9828 |
| optimal model of previous block | Accuracy | — | 0.9523 | 0.9616 | 0.9696 | 0.9721 |
| | Precision | — | 0.9534 | 0.9620 | 0.9699 | 0.9723 |
| | F1 Score | — | 0.9525 | 0.9617 | 0.9697 | 0.9721 |

The present disclosure further provides a computer readable storage medium, a neural network model update program is stored in the computer readable storage medium, and the neural network model update program, when executed by a processor, implements operations of the neural network model update method as described above.

The present disclosure further provides a neural network model update device, including: a memory, a processor, and a neural network model update program stored in the memory and executable on the processor, the neural network model update program, when executed by the processor, implements operations of the neural network model update method as described above.

Those skilled in the art should understand that the embodiments of the present disclosure can be provided as a method, a system, or a computer program product. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor or other programmable data processing equipment to produce a machine, such that the instructions executed by the processor of the computer or other programmable data processing equipment generate means for implementing the functions specified in one or more processes in the flowchart and/or one block or more in the block diagram.

These computer program instructions can also be stored in a computer-readable memory that can guide a computer or other programmable data processing equipment to work in a specific manner, such that the instructions stored in the computer-readable memory generate an article of manufacture including an instruction device that implements the function specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, and instructions executed on a computer or other programmable device provide operations for implementing functions specified in a flow or multiple flows in the flowchart and/or a block or multiple blocks in the block diagram.

It should be noted that in the claims, any reference signs located between parentheses should not be constructed as limitations on the claims. The word "comprising", "including", etc. does not exclude the presence of components or operations not listed in the claims. The word "a" or "an" preceding a component does not exclude the presence of multiple such components. The present disclosure can be implemented by means of hardware including several different components and by means of a suitably programmed computer. In the unit claims enumerating several devices, several of these devices may be embodied in the same hardware item. The use of the words "first", "second", and "third" does not indicate any order, and these words can be interpreted as names.

Although the embodiments of the present disclosure have been described, those skilled in the art can make additional changes and modifications to these embodiments once they learn the basic creative concept. Therefore, the appended claims are intended to be interpreted as including the embodiments and all changes and modifications falling within the scope of the present disclosure.

Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A neural network model update method, comprising operations of:

randomly generating a preset number of sub-neural network models as nodes in a blockchain based on a skeleton neural network;

using a ring signature to share a local data set in the blockchain, and uniformly dividing a data set in the blockchain to generate a training set and a test set;

training each node separately through the training set to generate a trained model, packaging the trained model as a model transaction and sharing the model transaction in the blockchain;

using the test set selected by voting to test the model transaction and generating a test result;

when the test result is greater than a benchmark evaluation, taking the sub-neural network model corresponding to the test result as a valid vote; and voting a previous block corresponding to the valid vote, selecting a consistent block, and updating all nodes.

2. The neural network model update method of claim 1, wherein the operation of using a ring signature to share a local data set in the blockchain, and uniformly dividing the data set in the blockchain to generate a training set and a test set comprises:

using the ring signature to package the local data set into a data transaction and sharing the data transaction anonymously in the blockchain, wherein the data transaction includes a transaction hash value, a data hash value, a timestamp, the ring signature, and a public key set; and using a hash value of a new block in Bitcoin as a random seed for dividing a data set to uniformly divide the data set to generate the training set and the test set.

3. The neural network model update method of claim 1, wherein the operation of using the test set selected by voting comprises:

voting on the training set for training the model transaction, and obtaining the data set corresponding to the training set with most votes; and obtaining the test set according to the data set; wherein the data set includes one test set and one training set.

4. The neural network model update method of claim 1, wherein the benchmark evaluation includes:

using the test set selected by the voting to test a model of the previous block to obtain the benchmark evaluation.

5. The neural network model update method of claim 1, wherein the model transaction includes at least following parts:

a transaction basic part including a transaction hash value, a timestamp, a signature and a public key;

a model and proof of work part including a model hash value, a model evaluation and a Merkel root of a model training set; and a voting part including a hash value of the previous block and a Merkel root of the data set.

6. The neural network model update method of claim 1, wherein the block includes a hash value of the block, a hash value of the previous block, a hash value of a model of the block, a timestamp, and a Merkel root of a voting result.

7. The neural network model update method of claim 6, further comprising a process of constructing the Merkel root of the voting result, including:

using the hash value of the previous block as a leaf node of the Merkel tree of the voting result in turn according to a descending order of the hash value of the previous block corresponding to the valid vote, and calculating a hash value of the leaf node;

performing a hash calculation on hash values of leaf nodes in pairs to generate a first sub-hash value; and performing a hash calculation on first sub-hash values in pairs to generate the Merkel root of the voting result, wherein the leaf node of the Merkel tree of the voting result includes a Merkel root of the valid vote.

8. The neural network model update method of claim 7, further comprising a process of constructing the Merkel root of the valid vote, including:

using a hash value of the valid vote as a leaf node of the Merkel tree of the valid vote in turn according to a descending order of the test result of the valid vote, and calculating hash values of leaf nodes in pairs to generate a second sub-hash value; and performing a hash calculation on second sub-hash values in pairs to generate the Merkel root of the valid vote.

* * * * *